United States Patent [19]
Davidson et al.

[11] 3,729,585
[45] Apr. 24, 1973

[54] DEVICE AND METHOD FOR IMPROVING THE VERTICAL RESOLUTION OF A TWO-DIMENSIONAL TELEVISION-BASED RADIATION DETECTION SYSTEM

[75] Inventors: Jackson B. Davidson; Arthur L. Case, both of Oak Ridge, Tenn.

[73] Assignee: The United States of America as represented by the United States Atomic Energy Commission

[22] Filed: Aug. 26, 1971

[21] Appl. No.: 175,230

[52] U.S. Cl.........178/7.2, 178/DIG. 25, 178/DIG. 34
[51] Int. Cl................................................H04n 5/14
[58] Field of Search....................178/7.1, 7.2, 7.6, 178/7.7, DIG. 25, DIG. 34

[56] References Cited

UNITED STATES PATENTS 3,361,872  1/1968  Sweeney....................178/DIG. 34

OTHER PUBLICATIONS

McMann, Jr. et al., Journal of the SMPTE. Vol. 77, March, 1968, pp. 221–228.

Primary Examiner—Robert L. Richardson
Attorney—Roland A. Anderson

[57] ABSTRACT

A device and method have been provided for improving the vertical resolution in a television-based radiation detection system. Impinging radiation detected in the form of scintillations occurring in a crystal is recorded by a television camera tube. As the information-containing target of the camera tube is scanned, each preceding horizontal scan is delayed one horizontal scan time and compared with the instant scan for coincidence of image, and if there, taking the ratio of the images, followed by testing of the resultant amplitude for proper location in a memory device. The vertical resolution is enhanced beyond that implied by the number of horizontal scans.

7 Claims, 3 Drawing Figures

Patented April 24, 1973

INVENTORS.
Jackson B. Davidson
BY Arthur L. Case

ATTORNEY.

INVENTORS.
Jackson B. Davidson
Arthur L. Case
BY
ATTORNEY.

DEVICE AND METHOD FOR IMPROVING THE VERTICAL RESOLUTION OF A TWO-DIMENSIONAL TELEVISION-BASED RADIATION DETECTION SYSTEM

BACKGROUND OF THE INVENTION

The present invention was made during the course of, or under, a contract with the U. S. Atomic Energy Commission.

This invention relates generally to radiation detecting devices and methods, and more specifically to improvements in the vertical resolution of a television-based two-dimensional position sensitive detection system.

Detection means for detecting the spatial distribution of radiation directed upon a scintillator target have in the past taken various forms. For example, it has been the practice in the past to use X-Y mechanical scanners which systematically scan an array of radiation sensors or a continuous screen scintillator target to record spatial distribution. These systems are inherently slow and limited to certain applications due to the loss of events which occur between scan times.

In order to speed up the scanning rate, it has been the practice to record scintillations on a target element by conventional television techniques. Such a system typically includes a continuous two-dimensional phosphor screen which converts impinging particles into scintillations. The screen is optically coupled to the face of a television camera tube in order that the scintillations may be stored temporarily as charged spots on the television tube target. The original position of the scintillations is maintained by this process. The television tube target is then scanned in a raster. As the scanning beam encounters the stored charge spots, it is amplitude-modulated sufficiently so that the spots may be recognized as pulses of current and stored according to their times of occurrence after the beginning of the scan. The scanning wipes the target clean and leaves it ready to accept other events. By holding the events until they can be recorded in an orderly and reproducible way, the two-dimensional spatial data is converted into a one-dimensional time measurement array. The current pulses may then be stored in a memory device by means of an address register that is maintained in synchronization with the scanning.

In the above television system, the vertical resolution, assuming the scanning is done horizontally, is fixed by the number of scan lines. The problem with this system, which has been overcome by the present invention, is that events which generate charged spots on the camera tube that overlap two scan lines are recorded twice. If the center of the event lies on a scan edge, the resulting signal is equally shared by the adjacent scans. This is not detrimental, the full information about the spot gets stored, but care must be taken to properly interpret it. However, those spots which do not equally overlap adjacent scan lines cannot be properly interpreted with the prior art television-based systems. At first glance, it would appear that an obvious solution to obtaining better vertical resolution would be by increasing the number of scan lines. However, for a fixed image size on the camera tube target, more than two scan lines through the image separate the available signal into additional parts which lower the signal to noise ratio of each part by reducing the signal. Furthermore, increasing the number of scan lines (typically 15,750 lines/sec.) increases the horizontal scanning rate for the same total scanning (field) time (one-sixtieth sec.). This means increased bandwith is necessary in the television electronics which reduce the signal to noise ratio by increasing noise. Therefore, it will be appreciated that there is a need for a method which will improve the vertical resolution in a two-dimensional television-based detection system.

SUMMARY OF THE INVENTION

In view of the above-stated need, it is an object of this invention to provide a means for use with a television-based two-dimensional radiation detection system in which the vertical resolution is improved beyond that implied by the number of horizontal scans.

Another object of this invention is to provide an improved television-based two-dimensional detection system in which events detected in positions which overlap adjacent scan lines are designated as to their centralmost position on a scintillator target viewed by a television camera tube.

Yet another object of this invention is to provide improved vertical resolution in a television-based detection system wherein event locations are stored in a memory device by providing a system for interpolating the centralmost location of adjacent scan overlapping events so that these event positions may be stored in proper locations in the memory device.

Briefly, the invention is an improvement in a television-based two-dimensional radiation detection system wherein a scintillator is scanned in a horizontal raster by a television camera to record events generated by radiation striking the scintillator according to the location of the event within the scintillator so as to facilitate storage in a memory device in accordance with the time of scanning of each event relative to the beginning of a scanning raster period. The improvement comprises means connected to the output of the camera for providing a delayed output signal at the output thereof wherein the delay period is equal to the period of one horizontal scan; a coincidence circuit for comparing the delayed scan signal from the camera tube with the succeeding scan so as to generate an output signal upon the detection of coincidence signals at the inputs indicating the detection of an event which overlaps adjacent scan lines; means controlled by the coincidence circuit output for accepting and comparing the amplitude of the coincidence signals and providing an output proportional to the ratio of the coincident signals, a multichannel discriminator which categorizes the ratio signals according to their amplitude at corresponding outputs; an address register having a first input connected to receive output signals from the camera synchronization directly and other inputs connected to respective outputs of the pulse height analyzer so that the vertical address is incremented in proportion to the ratio that a detected event overlaps adjacent scan lines, thereby increasing the vertical resolution of the event location along the vertical axis; and a storage device for storing events as addressed by the register.

Other objects and many of the attendant advantages of the present invention will be apparent from the following detailed description of the invention.

DETAILED DESCRIPTION

Figure 1:
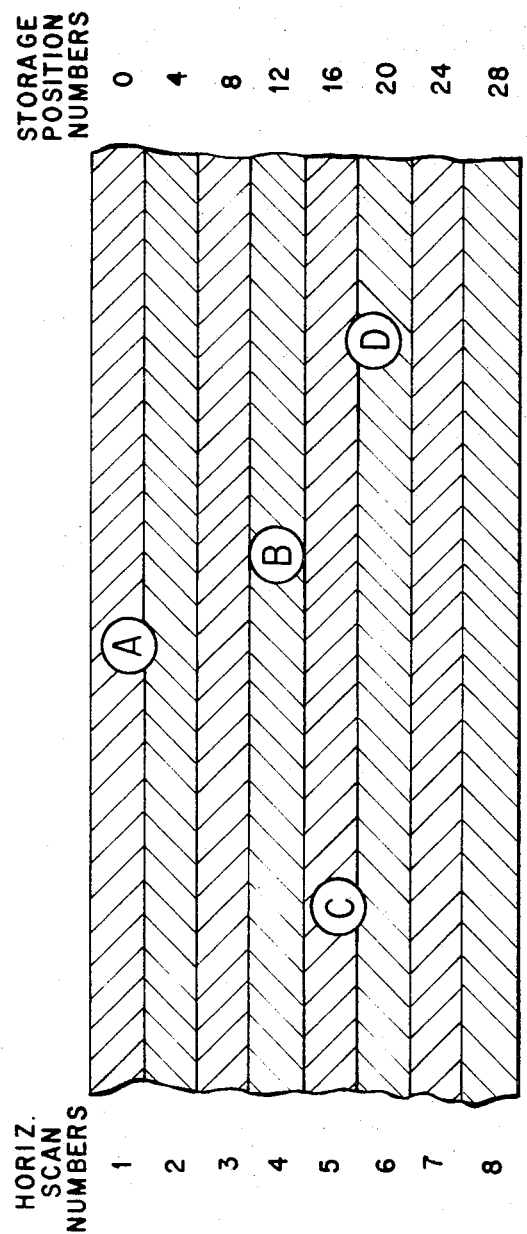
FIG. 1 is a representative drawing of eight horizontal scans made over a portion of the target of a television-based two-dimensional position sensitive detector showing various detected events.
Figure 2:
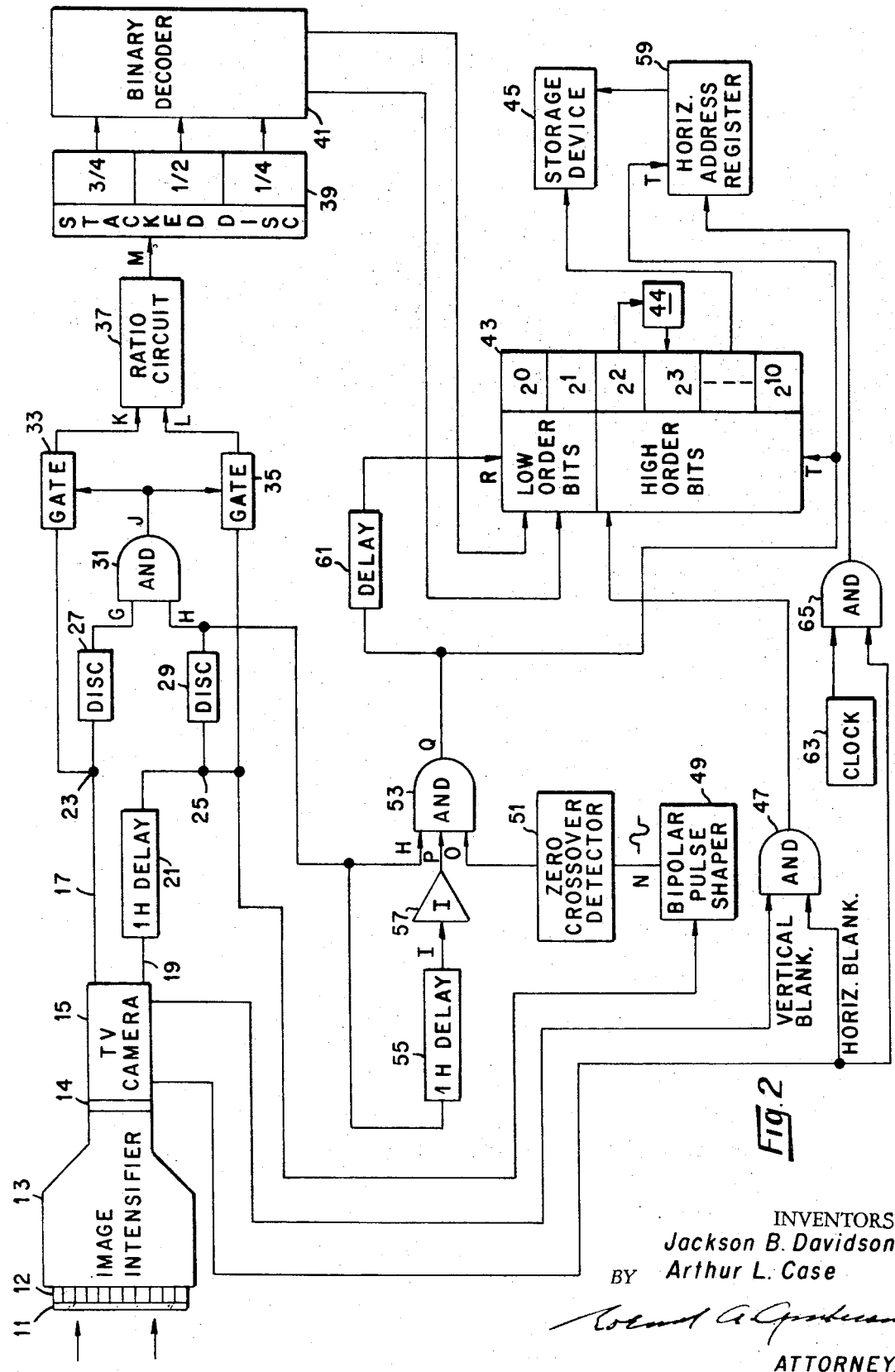
FIG. 2 is a block diagram of an improved television-based detection system according to the present invention.

Referring now to FIG. 1, adjacent horizontal scan line areas of a television tube are represented by the horizontal hatched areas. Various events detected at the camera target to generate charged spots are represented by the encircled letters A through D. The spots are focused in a conventional manner so as to be no larger in diameter than the width of a single scan line of the camera target. Since the scanning is done horizontally, the vertical resolution is fixed by the number of scan lines. As long as the detected events fall within particular scan lines it will be apparent that their position vertically is easily determined; but, if an event falls between scan lines, such as event C, it will be counted twice. In order to more exactly locate the center of an overlapping event, and thus improve upon the vertical resolution of the system beyond that fixed by the number of scan lines, the circuit shown in FIG. 2 has been provided. As shown, a conventional crystal scintillator 11 is optically coupled by means of optically transmissive fiber rods 12 to an image intensifier 13 which is, in turn, optically coupled by fiber rods 14 via the photocathode to the target screen of a television camera 15. The identical video outputs of camera 15 are directed in two different paths. The first path, taken on line 17, is connected to a point 23. The second path, taken on line 19, is connected by means of delay circuit 21 to a point 25. The delay presented by delay circuit 21 is fixed at exactly one-horizontal scan time. Thus, there is provided to points 23 and 25, respectively, the prompt scan and the delayed preceding scan synchronized with the adjacent prompt scan. Point 23 is connected to the input of a first leading edge discriminator 27 whose output pulse width encompasses the duration of the video signal pulse on line 17. Point 25 is connected to the input of a second leading edge discriminator 29 identical to that of discriminator 27. Each of the discriminators has identical trigger threshold levels so as to discriminate between the background noise level and the radiation source being monitored.

The outputs of discriminators 27 and 29 are put into coincidence by connection to respective inputs of an AND-gate 31. The output of this AND gate controls a pair of linear gates 33 and 35 which have their inputs connected to points 23 and 25, respectively. Thus, coincident signals are gated to the respective inputs of a ratio circuit 37 whose output is a signal equal to the ratio of coincident pulse amplitudes. The output of detector 37 is applied to the inputs of a multiple channel or stacked discriminator 39 which delivers outputs on respective lines according to the amplitude of the output of ratio detector 37, i.e., to the relative position of an event which overlaps adjacent scan lines. These outputs are decoded in a binary decoder 41 connected to receive the outputs from discriminator 39 and applied to set the two least significant bits of a scan line-plus-interpolation address register or vertical address register 43. This technique provides three additional vertical storage positions between each scan line. Thus, an address is stored in a storage device 45 which not only indicates the horizontal line; but, in the case of an event which overlaps adjacent scan lines, stores an address location which lies between the adjacent scan lines to provide more precise vertical location of the event.

The vertical address register 43 may take the form of a binary counter with a capacity of 512 counts in a high order counter section plus 3 counts in a low order counter actuated by the binary decoder 41 for interpolation of the vertical location of an event between scan lines and providing 2048 possible vertical addresses. Thus, the storage device must have a capacity for 2048 vertical storage locations.

The higher order counter of address register 43 is stepped by a positive going pulse generated at the output of an AND-gate 47 each time a horizontal scan begins. This is provided by connecting the inputs of AND-gate 47 to the vertical blanking signal output and the horizontal blanking signal output, respectively, of television camera 15, thereby synchronizing the counting of address register 43 with the camera scan rate.

In order to address the horizontal location of an event and initiate storage of the event address as in the storage device 45, point 25 is connected to the input of a bipolar pulse shaper 49 to provide a zero crossing for locating the center of the event image horizontally. The output of pulse shaper 49 is connected to the input of a zero crossing detector 51 which provides a short duration positive pulse to locate the event within the interval determined by the output from the leading edge discriminator 29. The output of detector 51 is connected to one input of an AND-gate 53 whose remaining inputs are connected to the output of discriminator 29, one directly to the output and the other through a serially connected delay circuit 55 and inverter 57. The delay circuit 55 is identical to that of delay circuit 21 (one horizontal scan time) and by inverting the output and placing in coincidence with the outputs of detector 51 double storage is prevented in the case where an event image falls on two scans. The output from the delayed second scan would cause a storage, adding an extra count at that address unless inhibited by the inverted output of delay circuit 55. This will be explained in more detail in the discussion of the operation presented below.

The output of AND-gate 53 controls the storage of event addresses in the storage device 45 by means of one connection to the transfer input T of the vertical address register 43 and to the same input T of a horizontal address register 59. The output of gate 53 is further connected through a delay circuit 61 to a reset input R of the interpolation counter section of the vertical address register 43. The delay presented by circuit 61 is only of sufficient time to permit transfer of the event address into the storage device 45 and then resets the interpolation bits in preparation for the next event.

The horizontal address may be provided in a conventional manner wherein clock pulses from a clock pulse generator 63 are gated into the horizontal address register 59 by means of an AND-gate 65 having an input connected to the horizontal blanking output of the television camera 15. The horizontal address register 59 may also be a conventional binary counter which is stepped through a cycle by the clock pulses from clock 63 whose repetition rate is fixed at 40 MHz so as to provide 2048 horizontal address locations for each horizontal scan.

Figure 3:
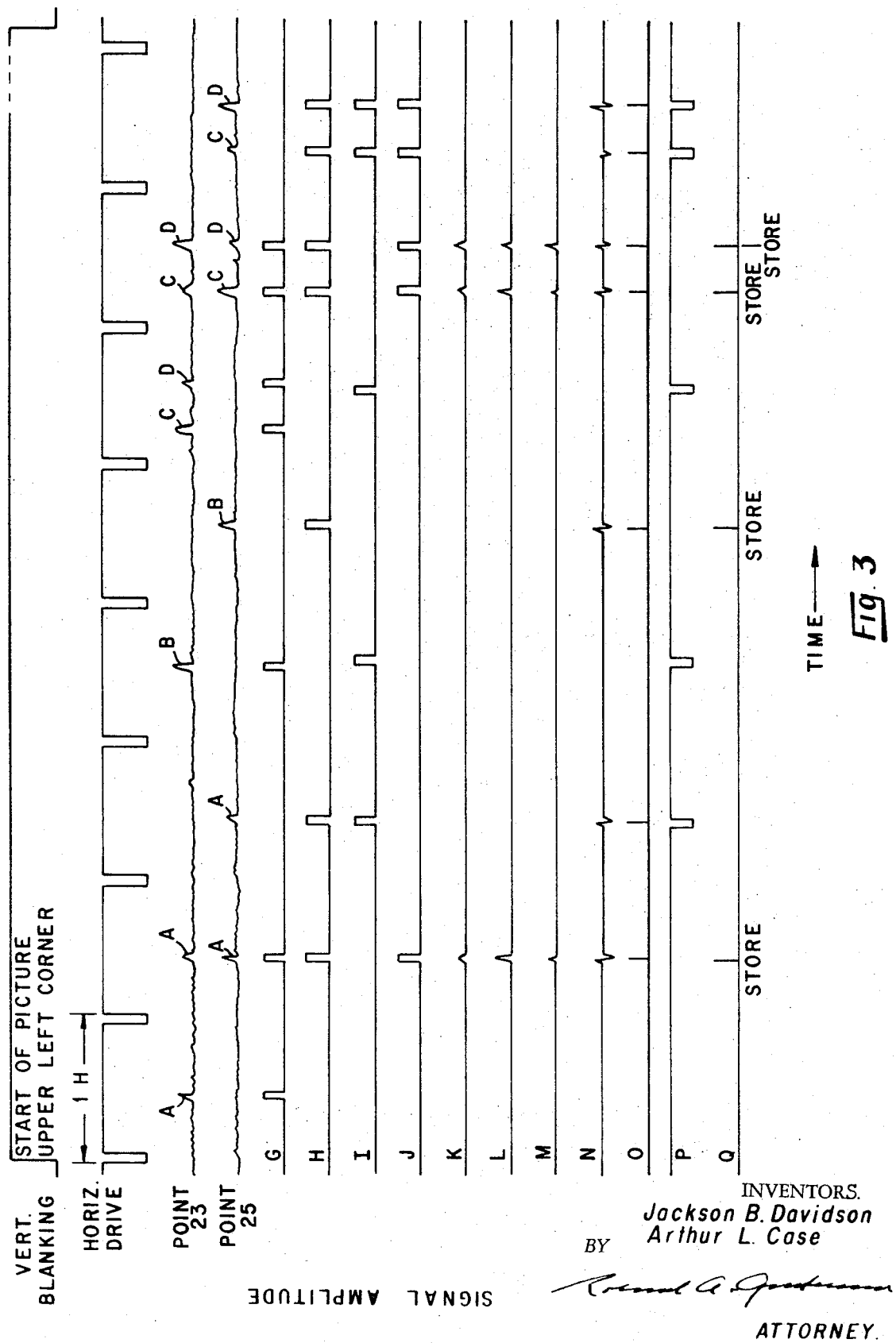
FIG. 3 is a timing diagram of the signals at various points in the diagram of FIG. 2 for the recording of events shown in FIG. 1.

In order to more clearly illustrate the operation of the device, four cases illustrating image positions, as shown in FIG. 1, will be discussed with reference to the timing diagram of FIG. 3. The detection of an event such as a neutron striking the phosphor screen 11 causes a scintillation in the screen which is focused upon the target of the camera tube 15 at a location corresponding to the location of the event in the screen 11. This image may be illustrated as image A of FIG. 1 which is seen to fall between scan lines 1 and 2 and remains there until it is cleared by the scanning electron beam of the camera. As shown in the timing diagram of FIG. 3, the scanning begins at the upper left hand corner of the camera target where the vertical blanking signal begins a scanning cycle. Coincidence between vertical blanking and horizontal blanking initiates the first horizontal scan.

Since image A falls between scan areas 1 and 2 and predominantly on scan 1, a signal is generated at point 23 which is detected by discriminator 27 which, in turn, generates a fixed duration pulse, but is inhibited at this time by AND-gate 31. As the second horizontal scan reaches the position of image A, the signal generated at the output (G) of discriminator 27 is in time coincidence with the delayed signal from scan one at the output (H) of discriminator 29. These two signals activate AND-gate 31 which activates gates 33 and 35 passing the prompt signal (K) and the delayed signal (L) from image A into the ratio circuit 37. The output (M) of circuit 37 is a signal equal to the ratio of the amplitude of the prompt signal to the delayed signal. Since image A extends only about one-fourth of the way over scan two, the ratio signal will be small, thereby exceeding only the first threshold level of the stacked discriminator 39 and thus be decoded as a binary "1" and sets the lowermost bit of the interpolation (low order bits) counter of register 43 accordingly. Thus, the vertical position 1 is set in register 43, and a "1" in higher order bits.

Simultaneously, the horizontal address register is set and storage is initiated by shaping the delayed pulse at point 25 into a bipolar pulse at the output (N) of pulse shaper 49 and detecting the zero crossover time for precise location of the center of intensity of image A to generate a very short duration pulse at the output (O) of detector 51. Since all inputs to AND-gate 53 at this time are high (positive) the output (Q) goes high for the duration of the signal at the output (O) of detector 51. This signal activates the transfer inputs to both the vertical register 43 and the horizontal register 59 which has been set by the input of clock pulses from clock 63 through gate 65 and the event address is stored in storage device 45. The low order counter of register 43 is reset after the storage of each event so that more than one event on a given scan may be stored. The horizontal blanking signal is also applied to the high order bits of register 43 through gate 47 to step the register one count at the beginning of each horizontal scan.

It will be noted that during scan number 3 the delayed signal appears again at the input of AND-gate 53; but, since the delayed signal has been further delayed for the period of one horizontal scan by delay circuit 55 and then inverted, the output (P) of inverter 57 is low and thus AND-gate 53 is inhibited from initiating the storage of an extra event.

Assume now that the next event (B) falls directly within a scan, as at scan 4. As in the above case, the prompt pulse B at point 23 is inhibited at AND-gate 31, but the delayed pulse is stored during scan 5. This would correspond to vertical position 12 in the storage device as indicated on the right of FIG. 1 since each scan is allotted four vertical address positions in the storage device, one for an event as B falls directly on the particular scan plus 3 positions for the three possible alternative interpolated positions for events which fall between scans.

In the more complicated case where more than one event falls between adjacent scans, such as events C and D, the events are first detected and inhibited at AND-gate 31 as in the case of A above. On the following scan the prompt signals and the delayed signals are placed in coincidence at gate 31. The first coincident signals from event C are passed through gates 33 and 35 to the ratio detector 39. Since the output of ratio detector 37 is small as shown in the timing diagram (FIG. 3), indicating that only a small portion overlaps scan 7, the first threshold level of discriminator 39 is exceeded setting the interpolation portion at the binary one level, adding 1 to the lower order bits in address register 43 whose higher order bits indicate position 16 and thus the event is stored at the vertical address location 17.

As soon as event C is stored the interpolation portion of the register 43 is reset by the delayed storage initiation pulse from gate 53 while the higher order bits remain at the same count. Since the ratio of the coincident pulses for event D, which overlaps the same scan lines as event C, is greater than that of C due to the amount of overlap of scan 7, the third threshold level of discriminator 39 will be exceeded, indicating that the event image is very close to three quarters of the distance over scan 7. Therefore, the binary decoder will generate a "3" which will be set into the interpolation portion of register 43 and store an event at the vertical address location 19 together with the proper horizontal address from register 59.

In order that the vertical position register 43 indicates positions starting at 0 the first stage of the higher order bits ($2^2$ stage) must be reset to "1" before the beginning of the first scan. The first scan then sets this stage to "0" which is the desired indication. The first carry from this stage must be inhibited by a carry inhibit circuit 44 in a conventional manner to prevent a "1" from being set in the $2^3$ stage. Only the first carry is inhibited; the other carrys from this stage are transmitted normally.

The horizontal address circuitry is conventional digital timing and forms no part of the invention. Except to complete an operable example of a system with which the subject invention is useful, detailed discussion of that portion of the exemplified embodiment has been omitted.

Although the above embodiment has been described for a system including only three additional positions of interpolation, it will be obvious to those skilled in the art that a larger number of positions of interpolation may be provided as long as the signal-to-noise ratio of the ratio circuit output allows and additional storage space is available. It will be noted that for additional levels of interpolation (conveniently added in powers of 2 - - i.e., doubled, quadrupled). Additional stages will be necessary in the lower order bit portion of the vertical position register 43. For example, if the interpolation positions are doubled, one stage must be added and the horizontal scan input pulses will be input to the $2^3$ (8) stage rather than $2^2$ (4) as in the example above.

While there has been shown and described what is considered to be the preferred embodiment of the invention, it will be understood that numerous modifications and additions thereto will be apparent to those skilled in the art. For example, the radiation being detected is not limited to that which produces scintillations in a crystal but could be ordinary light as in an extremely low level television system where the instantaneous image consists of individually occurring photoelectronic events which must be summed at each point to produce a recognizable pattern. The above device and method would be directly applicable. Accordingly, the above description and accompanying drawings should be taken as illustrative of the invention and not in a limiting sense.

What is claimed is:

1. In a television-based two-dimensional radiation detection system wherein a scintillator is scanned in a horizontal raster by a television camera to record events generated by radiation striking said scintillator, said television camera having an output for providing pulses corresponding to the detection of events relative to the scan position, the improvement comprising:
   a first delay circuit connected to the output of said camera for providing a delayed signal from said camera at an output thereof delayed in time equal to one horizontal scan time;
   a coincidence circuit means having first and second inputs and an output, said first input connected to the output of said first delay circuit and said second input connected to the output of said camera for providing an output pulse at a time corresponding to the application of coincident pulses from a prompt signal from said camera and said delayed signal indicating that a radiation image overlaps adjacent scan area of said camera;
   a linear gating means having first and second inputs and corresponding outputs and a control input for gating pulses applied to said inputs to the corresponding outputs upon application of a pulse to said control input, said control input connected to the output of said coincidence circuit means, said first input connected to the output of said camera and said second input connected to the output of said first delay circuit;
   a ratio circuit having first and second inputs connected respectively to said first and second outputs of said gating means for generating an output signal whose amplitude is proportional to the ratio of signals applied to said first and second inputs;
   means for recording output signals from said ratio circuit as indicative of the central position of corresponding events relative to adjacent scan lines.

2. The improved radiation detection system as set forth in claim 1 wherein said recording means comprises:
   a multichannel discriminator having an input connected to the output of said ratio circuit and a plurality of outputs corresponding to the number of channels of said discriminator;
   means connected to the outputs of said multichannel discriminator for converting output signals from said discriminator into a binary number corresponding to the amplitude of the output of said ratio circuit;
   a vertical address register having a plurality of low order bits connected to the output of said binary converting means and a plurality of high order bits;
   means for sensing the beginning of each horizontal scan of said television camera and stepping said high order bits of said vertical address register in a predetermined order in accordance with the horizontal scanning rate of said television camera; and
   a storage device coupled to said vertical address register.

3. The improved radiation detection system as set forth in claim 2 further including:
   means for generating an address transfer signal following the address registration of each radiation event location by said address register so that the address is transferred into said storage device;
   means for resetting the low order bits of said vertical address register following the storage of each event location; and
   means for generating a horizontal address for simultaneous storage in said storage device with said vertical address.

4. The improved radiation detection system as set forth in claim 3 wherein said multichannel discriminator is a three channel stacked discriminator, each channel corresponding to a predetermined amplitude of output signals, said ratio circuit corresponding to the amount of overlap of an adjacent succeeding scan line by an event.

5. The improved radiation detection system as set forth in claim 4 wherein said coincidence circuit means includes a first discriminator connected to the output of said first delay circuit; a second discriminator connected to the output of said camera; a first AND gate having first and second inputs connected, respectively, to the outputs of said first and second discriminators, said first AND gate having an output connected to said control input of said linear gating means.

6. The improved radiation detection system as set forth in claim 5 wherein said horizontal address generating means includes a horizontal address register; a clock pulse generator; and means for gating a predetermined number of clock pulses from said clock generator into said horizontal address register during each horizontal scan.

7. The improved radiation detection system as set forth in claim 6 wherein said address transfer signal generating means includes a second delay circuit having a delay equal to one horizontal scan time connected to the output of said first discriminator; an inverter connected to the output of said second delay circuit; a second AND gate having first, second and third inputs and an output, said first input connected to the output of said first discriminator, said second input connected to the output of said inverter; a bipolar pulse shaper connected to the output of said first delay circuit; a zero crossover detector connected between the output of said bipolar pulse shaper and said third input of said second AND gate; and said vertical and horizontal address register having transfer control inputs connected to the output of said second AND gate.

* * * * *